(12) United States Patent
Wang

(10) Patent No.: US 11,408,472 B2
(45) Date of Patent: Aug. 9, 2022

(54) DISC BRAKE PISTON RETRACTION TOOL

(71) Applicant: Tian Shoei Wang, Taichung (TW)

(72) Inventor: Tian Shoei Wang, Taichung (TW)

( * ) Notice: Subject to any disclaimer, the term of this patent is extended or adjusted under 35 U.S.C. 154(b) by 0 days.

(21) Appl. No.: 17/471,180

(22) Filed: Sep. 10, 2021

(65) Prior Publication Data

US 2021/0404523 A1 Dec. 30, 2021

(51) Int. Cl.
*F16D 65/00* (2006.01)
*B25B 27/00* (2006.01)

(52) U.S. Cl.
CPC ...... *F16D 65/0043* (2013.01); *B25B 27/0035* (2013.01)

(58) Field of Classification Search
CPC .......... F16D 65/0043; B25B 27/0035
USPC ........................................... 29/239
See application file for complete search history.

(56) References Cited

U.S. PATENT DOCUMENTS

| 8,826,504 | B1* | 9/2014 | Slivon ............... B25B 27/0035 |
| | | | 29/244 |
| 10,156,273 | B1* | 12/2018 | Huang ............... F16D 65/0043 |
| 2018/0180117 | A1* | 6/2018 | Wu ....................... F16D 41/066 |
| 2019/0076997 | A1* | 3/2019 | Hernandez, Jr. .... B25B 27/0035 |
| 2020/0353608 | A1* | 11/2020 | Engel ................. B25B 27/0021 |
| 2020/0393008 | A1* | 12/2020 | Dahl .................. F16D 65/0043 |
| 2021/0071725 | A1* | 3/2021 | Tseng ................ B25B 27/0035 |
| 2021/0095730 | A1* | 4/2021 | Tseng .................... B25B 27/023 |
| 2021/0140499 | A1* | 5/2021 | Tseng ..................... F16H 55/02 |

* cited by examiner

*Primary Examiner* — Lee D Wilson
*Assistant Examiner* — Jonathan G Santiago Martinez

(57) ABSTRACT

A disc brake piston retraction tool includes a reversible ratchet wrench, a first pressure plate assembly, and a second pressure assembly. In the process of retracting a piston, a first engaging notch of a first L-shaped elastic plate of a first buckle member and a second engaging notch of a second L-shaped elastic plate of a second buckle member are pressed against a first force output shaft and a second force output shaft to provide an anti-rotation effect. Thus, when an operating handle of the reversible ratchet wrench is pulled back, it will not link a ratchet wheel, so as to carry out an effective operation of retracting the piston.

10 Claims, 15 Drawing Sheets

DISC BRAKE PISTON RETRACTION TOOL

FIELD OF THE INVENTION

The present invention relates to a disc brake piston retraction tool. When an operating handle of a reversible ratchet wrench of the tool is pulled back, a ratchet wheel won't be linked to rotate reversely, so as to ensure the stability and effectiveness of the operation for retracting a piston. The convenience of using the tool with one hand is also improved.

BACKGROUND OF THE INVENTION

For the repair of a vehicle brake system with a disc brake, it is required to use various special tools. The disc brake often includes a caliper housing. The caliper housing is positioned near a wheel assembly. The wheel assembly has a rotor or brake disc rotatably mounted therewith. The caliper housing is associated with at least one piston that moves back and forth in a cylinder, and includes a pair of opposite brake pads for clamping the rotor in response to the movement of the piston. When the driver steps on the brake pedal, the brake fluid flows from the master cylinder into the cylinder associated with the caliper housing to push the piston and force the brake pads to engage the rotor so as to stop rotation of the wheels. When the brake pads suffer a lot of wear and tear after a period of use, new brake pads need to be replaced to maintain proper braking force during driving. However, because of wear and tear of the brake pads, the piston gradually moves outward to the inside of the caliper housing, which gradually narrows the space for the brake pads. In this case, the caliper housing is removed from the wheel assembly of the vehicle, and special tools are used to separate the brake pads and/or push the piston back to the initial position in the cylinder for replacing the brake pads. Then, the caliper housing is reinstalled in the wheel assembly and positioned, and new brake pads are accommodated in the caliper housing to engage the rotor.

In general, auto mechanics responsible for repairing disc brakes and replacing brake pads may use various press machine tools. For these press machine tools, one difficulty is the need for professional mechanical use capabilities to achieve the retraction of one or more pistons associated with the caliper housing. Therefore, for brake repair and brake pad replacement, there is a need to operate an easy-to-use tool for retraction of one or more pistons.

U.S. Pat. No. 8,826,504 B1 discloses a disc brake piston retractor tool. The tool is placed in the inner space of the caliper housing. Through the reciprocating operation of the reversible ratchet wrench, the first pressure plate and the second pressure plate are unidirectionally driven to gradually move outwardly toward the extended position. The first pressure plate abuts against the fixed wall of the caliper housing as a support, and the second pressure plate is used to push the protruding piston back to the initial position in the cylinder associated with the caliper housing. In the aforementioned U.S. patent, the spacer bar of the reversible ratchet wrench assembly is simply pulled back and forth to push the piston back into the cylinder. However, when the spacer bar is pulled back, the coupler is not restricted from rotating reversely. When the second pressure plate is not tightly pressed against the piston, there will be a problem that the ratchet wheel is rotated reversely when the spacer bar is pulled back. Referring to FIG. 1 and FIG. 2, when the handle 1 (equivalent to the spacer bar) is pulled back, the spring 11 pushes the plunger pin 12 against the surface of the nose 130 of the pawl 13. Because the claw 131 is maintained at the position of the notch 140 of the ratchet wheel 14, it still has a certain engaging force. Since the coupler 15 that is coaxially connected with the ratchet wheel 14 is not restricted from rotating reversely, the coupler 15 is easy to rotate reversely when the handle 1 is pulled back. In the case that the coupler 15 is rotated reversely, the pressure plate 17 screwed to the coupler 15 through the stud 16 may be retracted or tilted when the handle 1 is pulled back. In practice, the operator needs to hold the pressure plate 17 with the other hand to avoid this situation, but this affects the operational convenience and use of the tool.

SUMMARY OF THE INVENTION

The primary object of the present invention is to provide a disc brake piston retraction tool, comprising a reversible ratchet wrench, a first pressure plate assembly, and a second pressure assembly.

The reversible ratchet wrench includes an operating handle, a ratchet wheel located at a force output end of the operating handle, and a force output member located at a center of the ratchet wheel. The force output member has a first force output shaft and a second force output shaft that are located at both sides of the center of the ratchet wheel and extend out of both sides of the force output end of the operating handle, respectively. A surface of the first force output shaft is formed with a first external thread. A surface of the second force output shaft is formed with a second external thread. The first external thread and the second external thread are in different spiral directions.

The first pressure plate assembly includes a first pressure plate, a first nut, and at least one first buckle member. The first pressure plate has an outer surface and an inner surface. The first nut is fixed to the inner surface of the first pressure plate relative to the first force output shaft. The first nut has a first internal screw hole screwed with the first external thread. The first buckle member is fixed on an outer surface of the first nut. A front edge of one end of the first buckle member has a first L-shaped elastic plate extending in the direction of the surface of the first force output shaft. The first L-shaped elastic sheet is formed with a first engaging notch corresponding in diameter to the first force output shaft and pressed against the first external thread to jump on roots and crests of the first external thread.

The second pressure plate assembly includes a second pressure plate, a second nut, and at least one second buckle member. The second pressure plate has an outer surface and an inner surface. The second nut is fixed to the inner surface of the second pressure plate relative to the second force output shaft. The second nut has a second internal screw hole screwed with the second external thread. The second buckle member is fixed on an outer surface of the second nut. A front edge of one end of the second buckle member has a second L-shaped elastic plate extending in the direction of the surface of the second force output shaft. The second L-shaped elastic sheet is formed with a second engaging notch corresponding in diameter to the second force output shaft and pressed against the second external thread to jump on roots and crests of the second external thread.

When in use, the first pressure plate and the second pressure plate of the tool are placed in an internal space of a caliper housing and located between at least one piston that is not retracted and a fixed wall. The force output direction of the reversible ratchet wrench is selective. The operating handle of the reversible ratchet wrench is pulled back and forth, and then the ratchet wheel links the first force output shaft and the second force output shaft to rotate in one direction. The spiral movement of the first external thread and the second external thread act on the first internal screw hole of the non-rotating first nut and the second inner screw hole of the non-rotating second nuts, such that the first pressure plate and the second pressure plate are driven to extend and move away from each other. The fixed wall is configured to confine the movement of the first pressure plate and the second pressure plate and serves as a force support, so that the piston is retracted to the starting position in the cylinder. In the process of retracting the piston, the first engaging notch of the first L-shaped elastic plate of the first buckle member and the second engaging notch of the second L-shaped elastic plate of the second buckle member are pressed against the first force output shaft and the second force output shaft to provide an anti-rotation effect. Thus, when the operating handle of the reversible ratchet wrench is pulled back, it will not link the ratchet wheel, so as to ensure the stability and effectiveness of the operation for retracting the piston. The convenience of using the tool with one hand is also improved.

Preferably, the force output end of the operating handle has an accommodating hole therein. The ratchet wheel and a pawl are pivotally connected in the accommodating hole. The pawl in the accommodating hole is pivotally connected to a side edge of the ratchet wheel through a pivot hole. The pawl has a pair of switching portions that are disposed at both ends of the pivot hole and extend out of the accommodating hole. A nose-shaped protrusion is formed on one side between the pair of switching portions. Two spaced claws each corresponding in shape to a tooth space of the ratchet wheel are formed on another side between the pair of switching portions. One side of the pawl is provided with a spring installed in a long groove to push a stopper against one side of the nose-shaped protrusion, so that one of the two claws is engaged with the tooth space of the ratchet wheel. When the operating handle is swung in one direction, the claw of the pawl pushes the ratchet wheel to rotate. On the contrary, when the operating handle is swung back, the nose-shaped protrusion presses the stopper into the long groove, so that the claw jumps on the teeth of the ratchet wheel and won't push the ratchet wheel to rotate reversely, thereby achieving the effect of unidirectional rotation of the ratchet wheel. When the operating handle is swung back, the stopper against the surface of the nose-shaped protrusion of the pawl is compressed and it has low resistance and rebounds back in height after being compressed, such that the first L-shaped elastic plate of the first buckle member and the second L-shaped elastic plate of the second buckle member are pressed against the first force output shaft and the second force output shaft to provide an anti-rotation effect so that the ratchet wheel won't be pushed by the pawl to rotate reversely when the operating handle is swung back.

Preferably, a polygonal mounting hole is formed in the center of the ratchet wheel. A polygonal coupling portion is formed between the first force output shaft and the second force output shaft of the force output member relative to the polygonal mounting hole. The polygonal coupling portion is mounted to the polygonal mounting hole so that the force output member is coupled to the center of the ratchet wheel. The force output member can be processed independently with a bar material. The arrangement of the force output member in the center of the ratchet wheel reduces the waste loss of processing materials.

Preferably, the first pressure plate and the second pressure plate each have a coupling hole relative to the first force output shaft and the second force output shaft. The first nut and the second nut each have a neck portion relative to the coupling hole of the first pressure plate and the coupling hole of the second pressure plate. The neck portion of the first nut is tightly fitted and fixed to the coupling hole of the first pressure plate. The neck portion of the second nut is tightly fitted and fixed to the coupling hole of the second pressure plate. The first pressure plate and the second pressure plate can be concentrically, symmetrically extended away from each other or retracted toward each other.

Preferably, the first nut has an even-numbered polygonal surface. A pair of the first buckle members corresponding in shape to the polygonal surface is butted and fixed to the polygonal surface. The first engaging notches of the first L-shaped elastic plates of the pair of first buckle members are pressed against the first external thread of the first force output shaft. The polygonal surface of the first nut limits the pair of first buckle members on the first nut without swinging and offset, so that the first force output shaft is pressed by the first L-shaped elastic plates of the pair of first buckle members. The anti-rotation effect on the first force output shaft can be achieved when the operating handle of the reversible ratchet wrench is pulled back. The polygonal surface of the first nut is circumferentially formed with a groove. The pair of first buckle members is provided with at least one buckle to be engaged in the groove. By the buckle engaged in the groove, the pair of first buckle members won't displace axially on the first nut. In the process that the first engaging notches of the first L-shaped elastic plates jump on the roots and crests of the first external thread, the pair of first buckle members won't be axially disengaged from the polygonal surface of the first nut. The pair of first buckle members is butted on the polygonal surface of the first nut. The first L-shaped elastic plates are disposed on distal end faces of the pair of first buckle members relative to a butting position. The distal end surfaces each have a pair of slots at respective two sides of the first L-shaped elastic plates, so that the connection of the first L-shaped elastic plates and the distal end faces has good recovery elasticity.

Preferably, the second nut has an even-numbered polygonal surface. A pair of the second buckle members corresponding in shape to the polygonal surface is butted and fixed to the polygonal surface. The second engaging notches of the second L-shaped elastic plates of the pair of second buckle members are pressed against the second external thread of the second force output shaft. The polygonal surface of the second nut limits the pair of second buckle members on the second nut without swinging and offset, so that the second force output shaft is pressed by the second L-shaped elastic plates of the pair of second buckle members. The anti-rotation effect of the second force output shaft can be achieved when the operating handle of the reversible ratchet wrench is pulled back. The polygonal surface of the second nut is circumferentially formed with a groove. The pair of second buckle members is provided with at least one buckle to be engaged in the groove. By the buckle engaged in the groove, the pair of second buckle members won't displace axially on the second nut. In the process that the second engaging notches of the second L-shaped elastic plates jump on the roots and crests of the second external thread, the pair of second buckle members won't be axially disengaged from the polygonal surface of the second nut. The pair of second buckle members is butted on the polygonal surface of the second nut. The second L-shaped elastic plates are disposed on distal end faces of the pair of second buckle members relative to a butting position. The distal end surfaces each have a pair of slots at respective two sides of the second L-shaped elastic plates, so that the connection of the second L-shaped elastic plates and the distal end faces has good recovery elasticity.

DESCRIPTION OF THE PREFERRED EMBODIMENTS

Embodiments of the present invention will now be described, by way of example only, with reference to the accompanying drawings.

Figure 1:
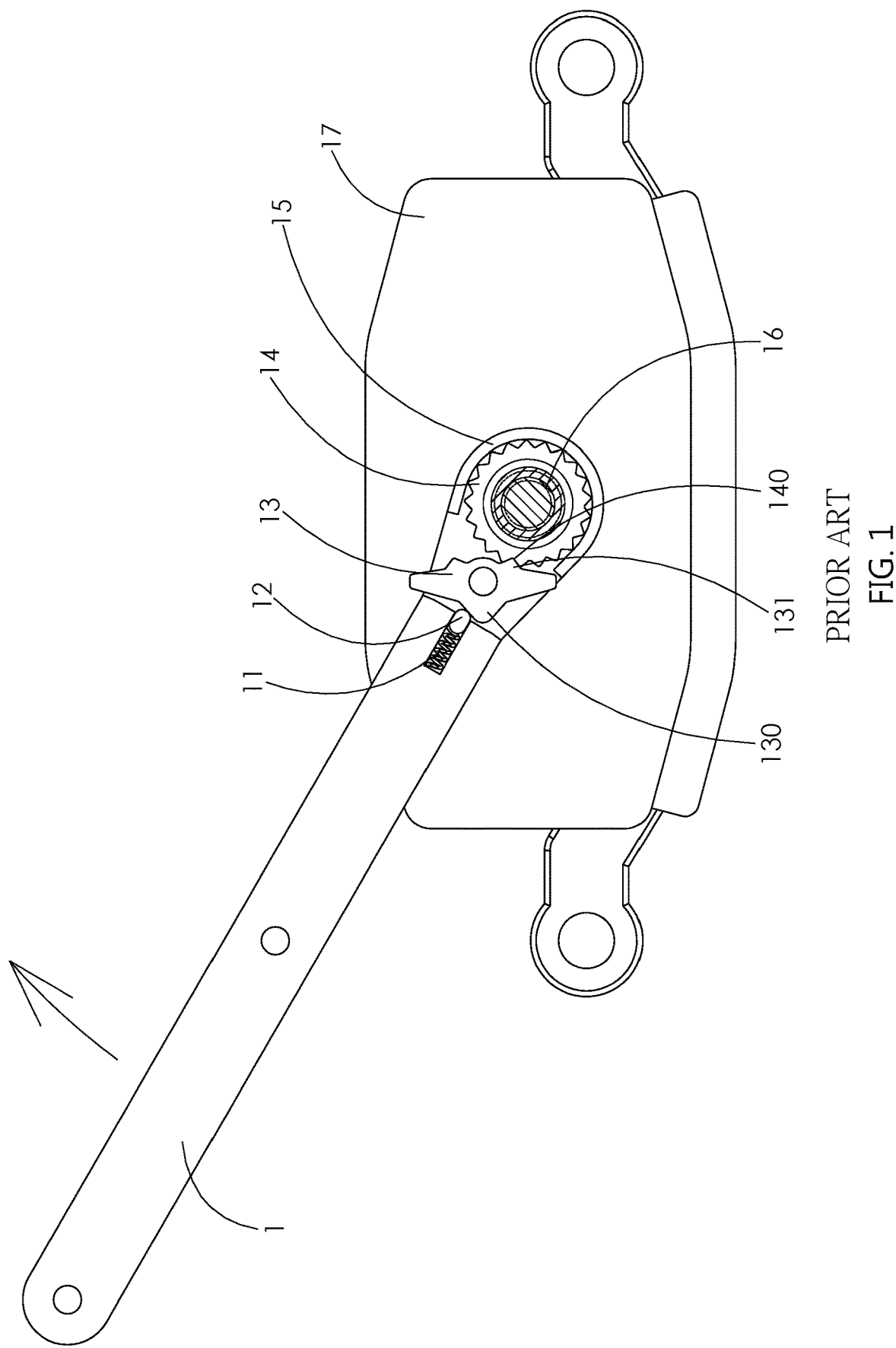
FIG. 1 is a schematic view showing the structure of a conventional tool.
Figure 2:
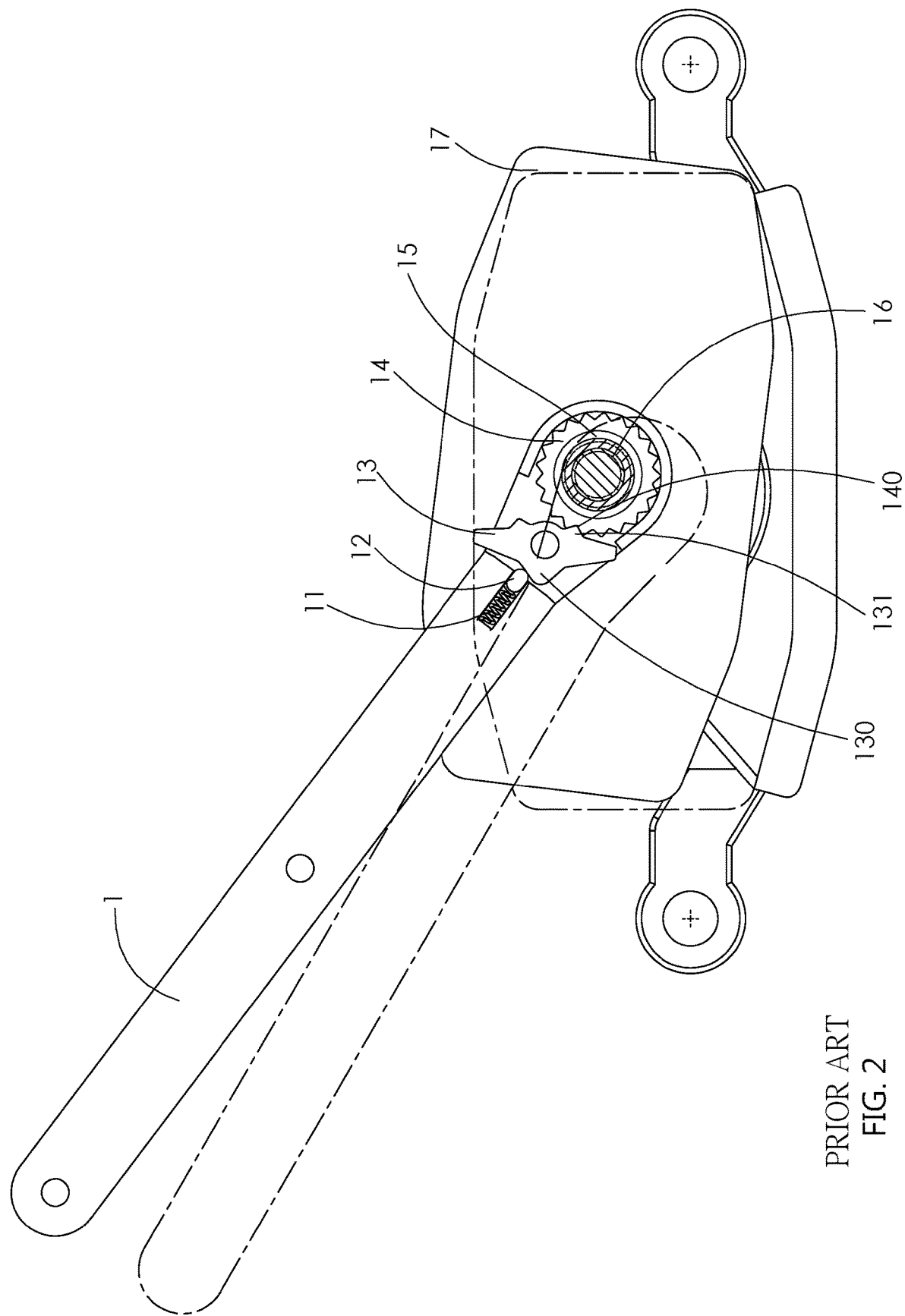
FIG. 2 is a schematic view of the conventional tool when in use.
Figure 3:
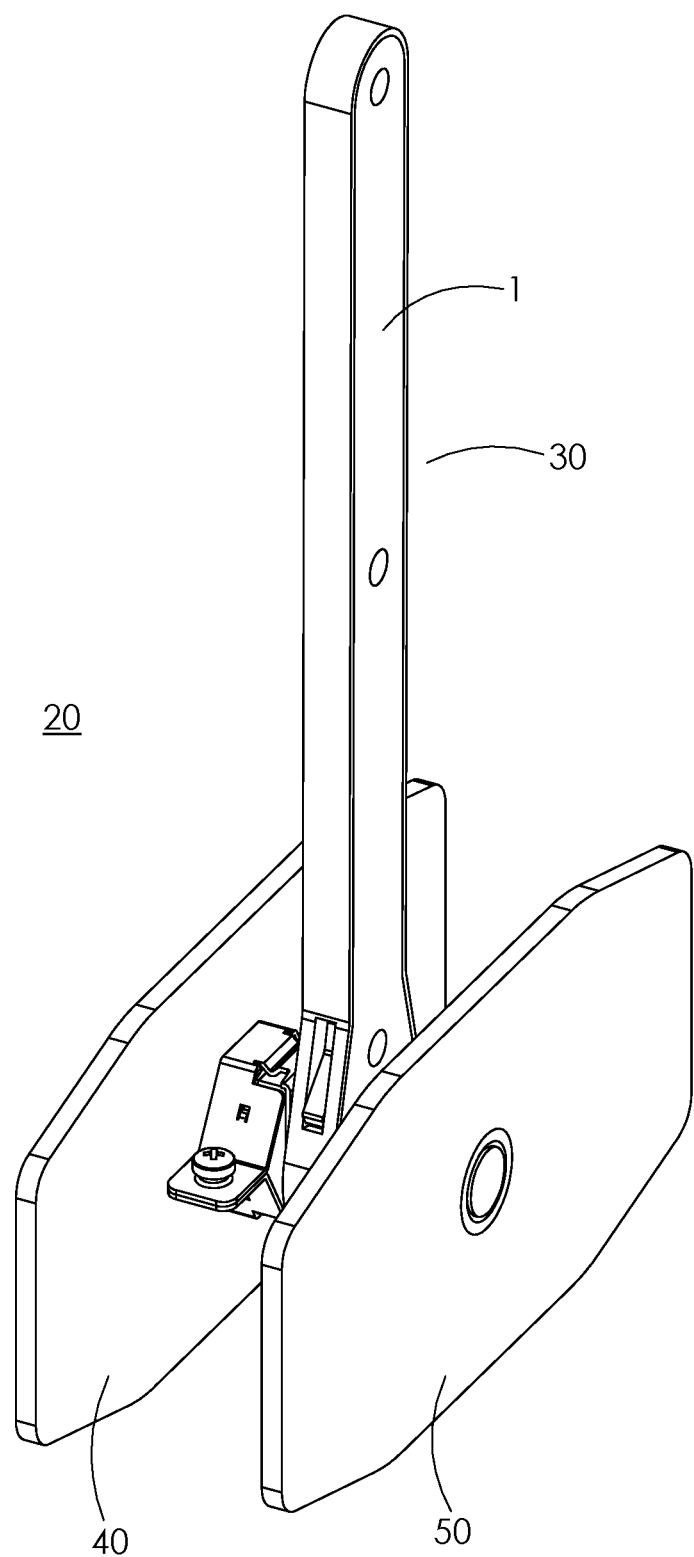
FIG. 3 is a perspective view of the present invention.
Figure 4:
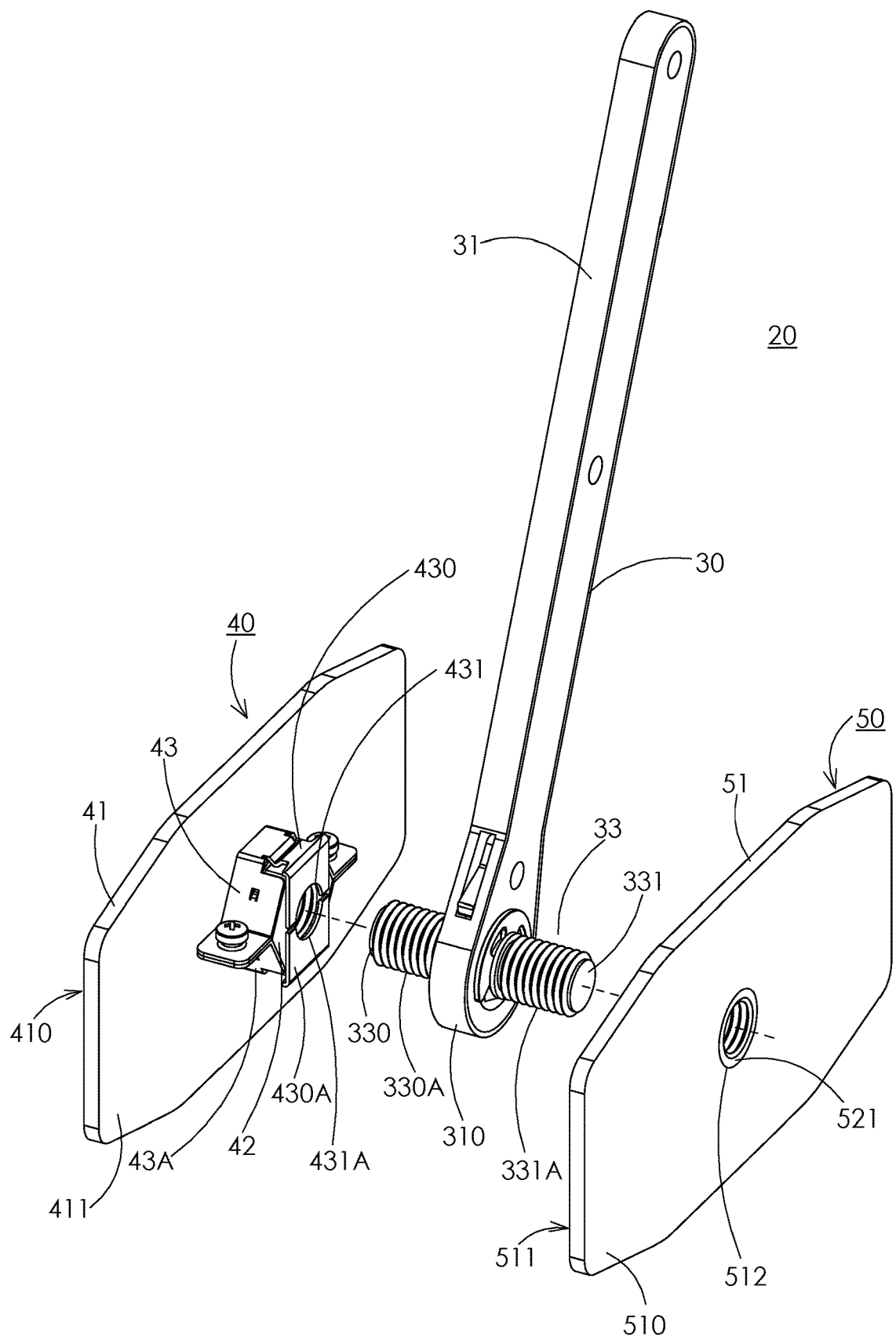
FIG. 4 is an exploded view of the present invention.

A disc brake piston retraction tool, as shown in FIG. 3 and FIG. 4, is a tool 20 and comprises a reversible ratchet wrench 30, a first pressure plate assembly 40, and a second pressure assembly 50.

Figure 5:
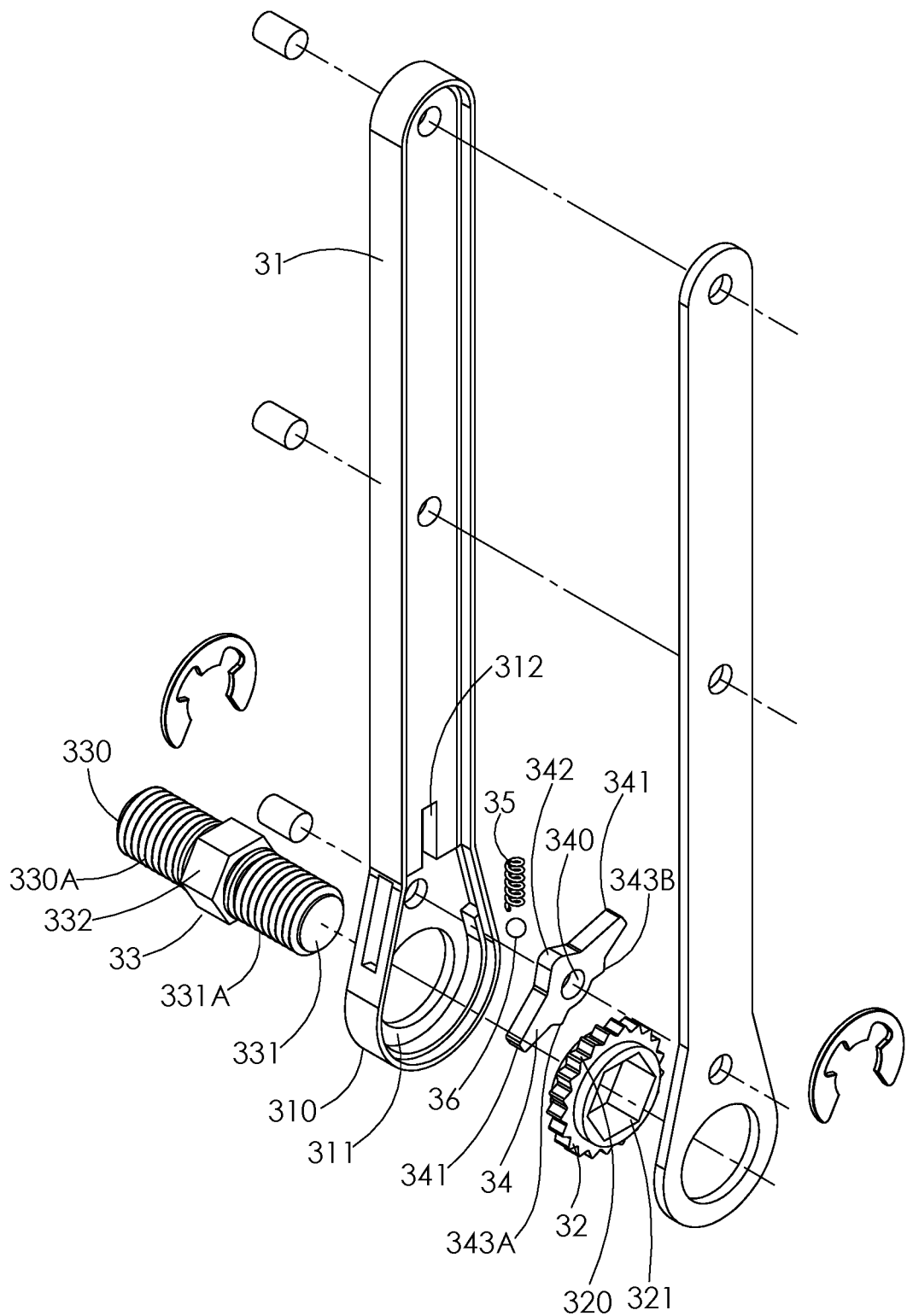
FIG. 5 is an exploded view of the reversible ratchet wrench of the present invention.

The reversible ratchet wrench 30, as shown in FIG. 4 and FIG. 5, includes an operating handle 31, a ratchet wheel 32 located at a force output end 310 of the operating handle 31, and a force output member 33 located at the center of the ratchet wheel 32.

The force output member 33 has a first force output shaft 330 and a second force output shaft 331 that are located at both sides of the center of the ratchet wheel 32 and extend out of both sides of the force output end 310 of the operating handle 31, respectively. The surface of the first force output shaft 330 is formed with a first external thread 330A, and the surface of the second force output shaft 331 is formed with a second external thread 331A. The first external thread 330A and the second external thread 331A are in different spiral directions. Preferably, the first external thread 330A is a right-hand external thread, and the second external thread 331A is a left-hand external thread.

Figure 6:
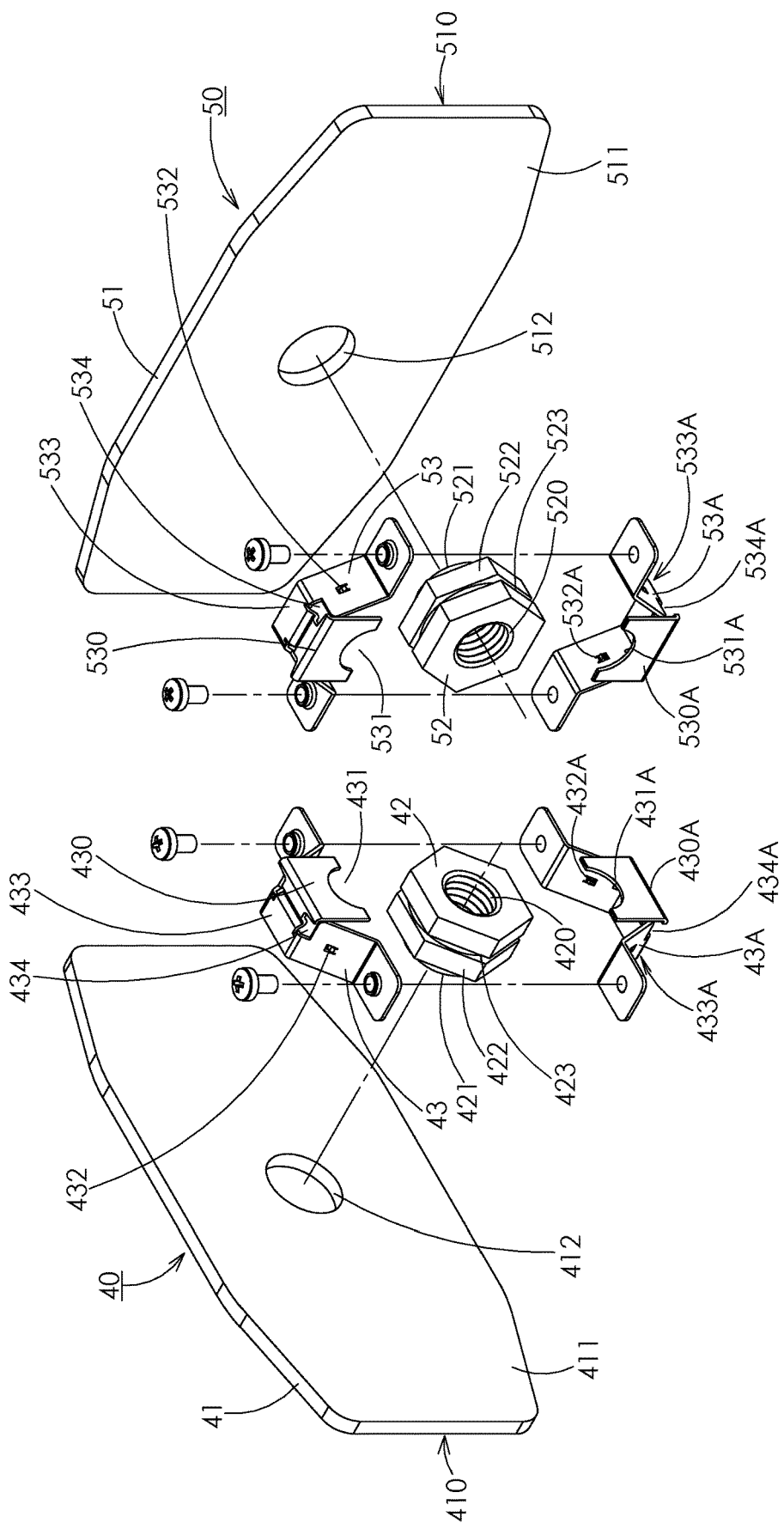
FIG. 6 is an exploded view of the first pressure plate assembly and the second pressure assembly of the present invention.
Figure 7:
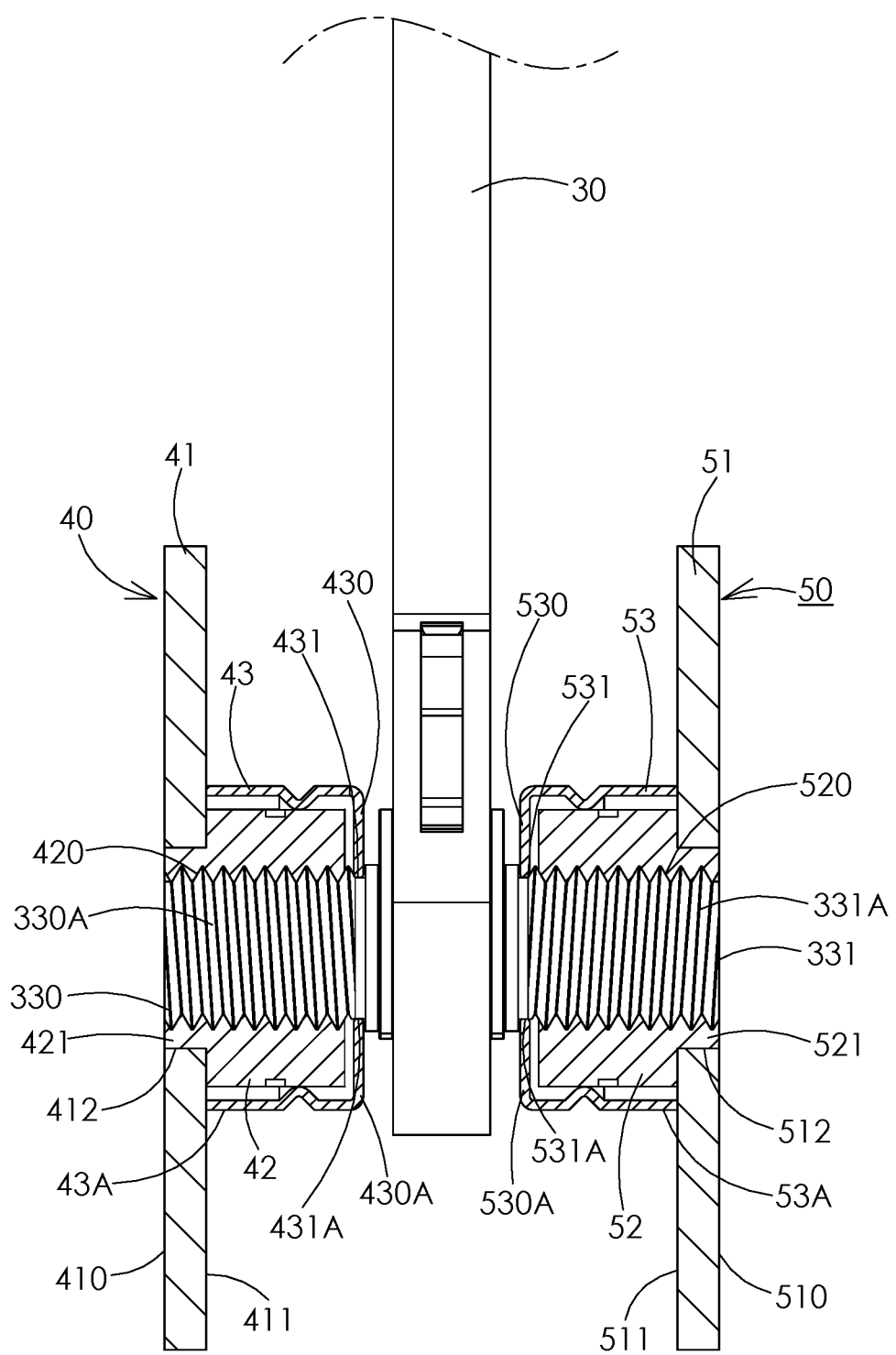
FIG. 7 is a cross-sectional view of the first pressure plate assembly and the second pressure assembly of the present invention.

The first pressure plate assembly 40, as shown in FIG. 4, FIG. 6 and FIG. 7, includes a first pressure plate 41, a first nut 42 and at least one first buckle member 43. The first pressure plate 41 has an outer surface 410 and an inner surface 411. The first nut 42 is fixed to the inner surface 411 of the first pressure plate 41 relative to the first force output shaft 330. The first nut 42 has a first internal screw hole 420 screwed with the first external thread 330A. The first buckle member 43 is fixed on the outer surface of the first nut 42. The front edge of one end of the first buckle member 43 has a first L-shaped elastic plate 430 extending in the direction of the surface of the first force output shaft 330. The first L-shaped elastic sheet 430 is formed with a first engaging notch 431 corresponding in diameter to the first force output shaft 330 and pressed against the first external thread 330A to jump on the roots and crests of the first external thread 330A.

The second pressure plate assembly 50, as shown in FIG. 6 and FIG. 7, includes a second pressure plate 51, a second nut 52 and at least one second buckle member 53. The second pressure plate 51 has an outer surface 510 and an inner surface 511. The second nut 52 is fixed to the inner surface 511 of the second pressure plate 51 relative to the second force output shaft 331. The second nut 52 has a second internal screw hole 520 screwed with the second external thread 331A. The second buckle member 53 is fixed on the outer surface of the second nut 52. The front edge of one end of the second buckle member 53 has a second L-shaped elastic plate 530 extending in the direction of the surface of the second force output shaft 331. The second L-shaped elastic sheet 530 is formed with a second engaging notch 531 corresponding in diameter to the second force output shaft 331 and pressed against the second external thread 331A to jump on the roots and crests of the second external thread 331A.

Figure 8:
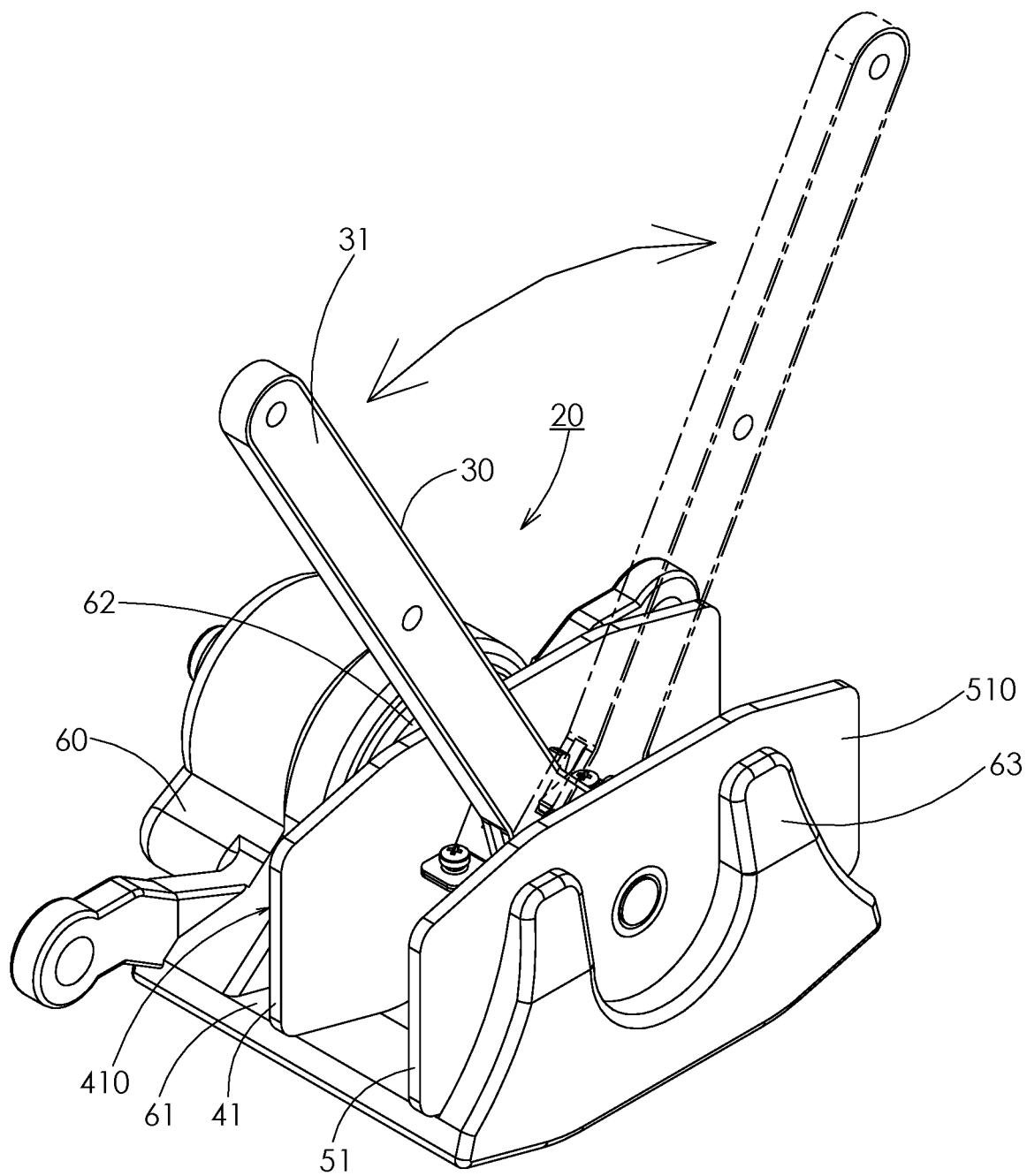
FIG. 8 is a schematic view of the present invention when in use to cooperate with the caliper housing.
Figure 9:
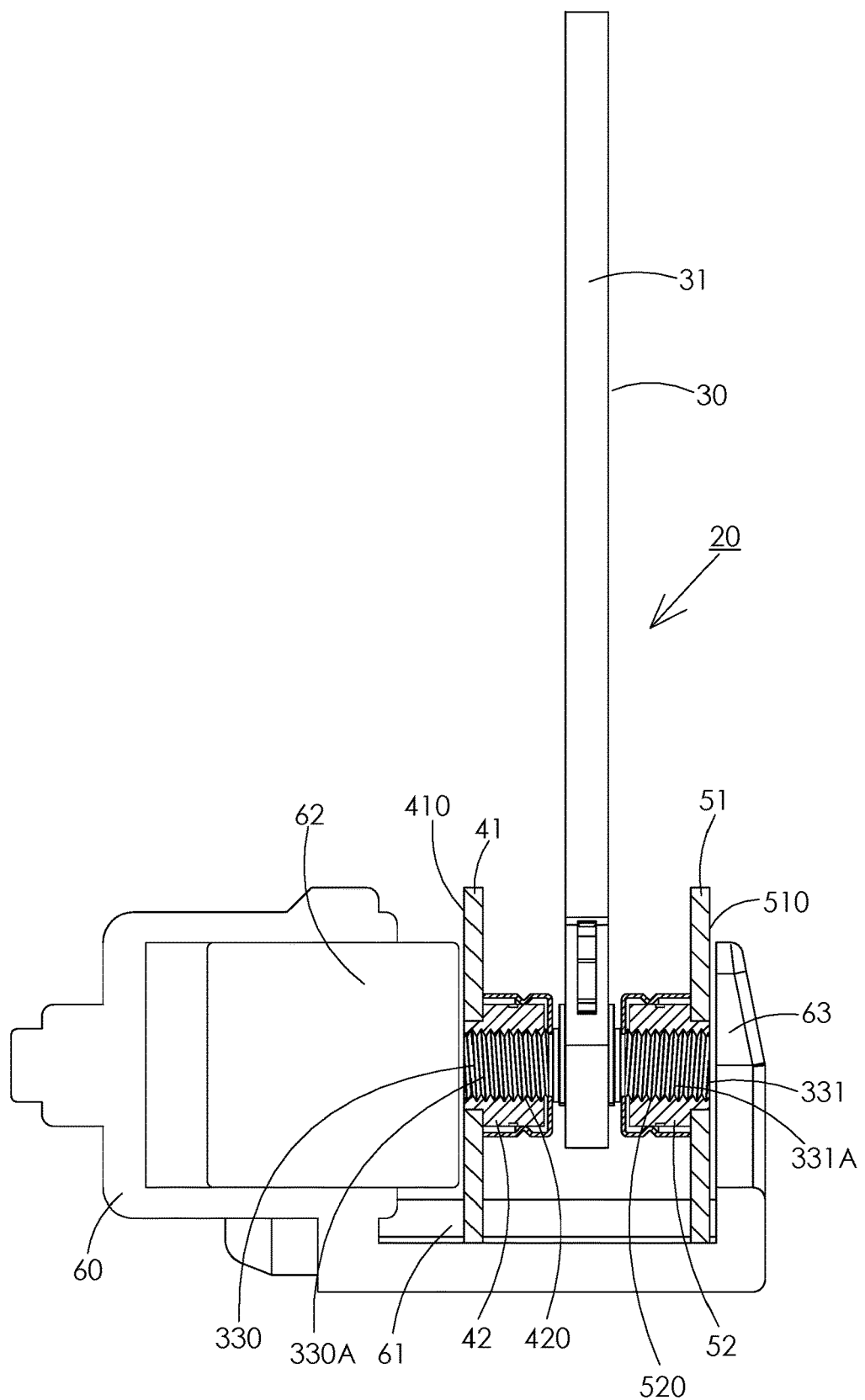
FIG. 9 is a cross-sectional view of the present invention when in use to cooperate with the caliper housing.
Figure 10:
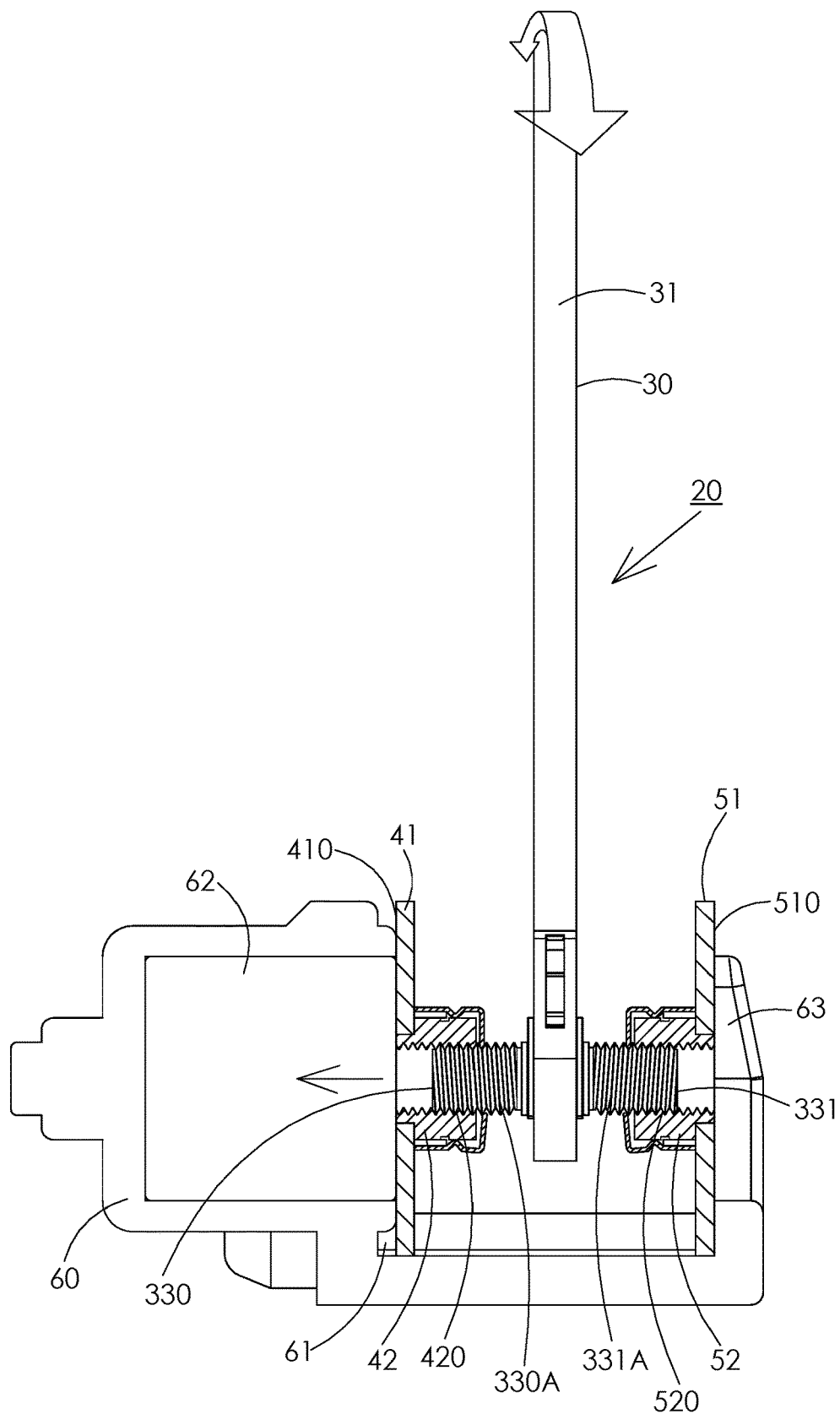
FIG. 10 is a schematic view of the present invention when in use, showing that the piston of the caliper housing is pushed back.
Figure 11:
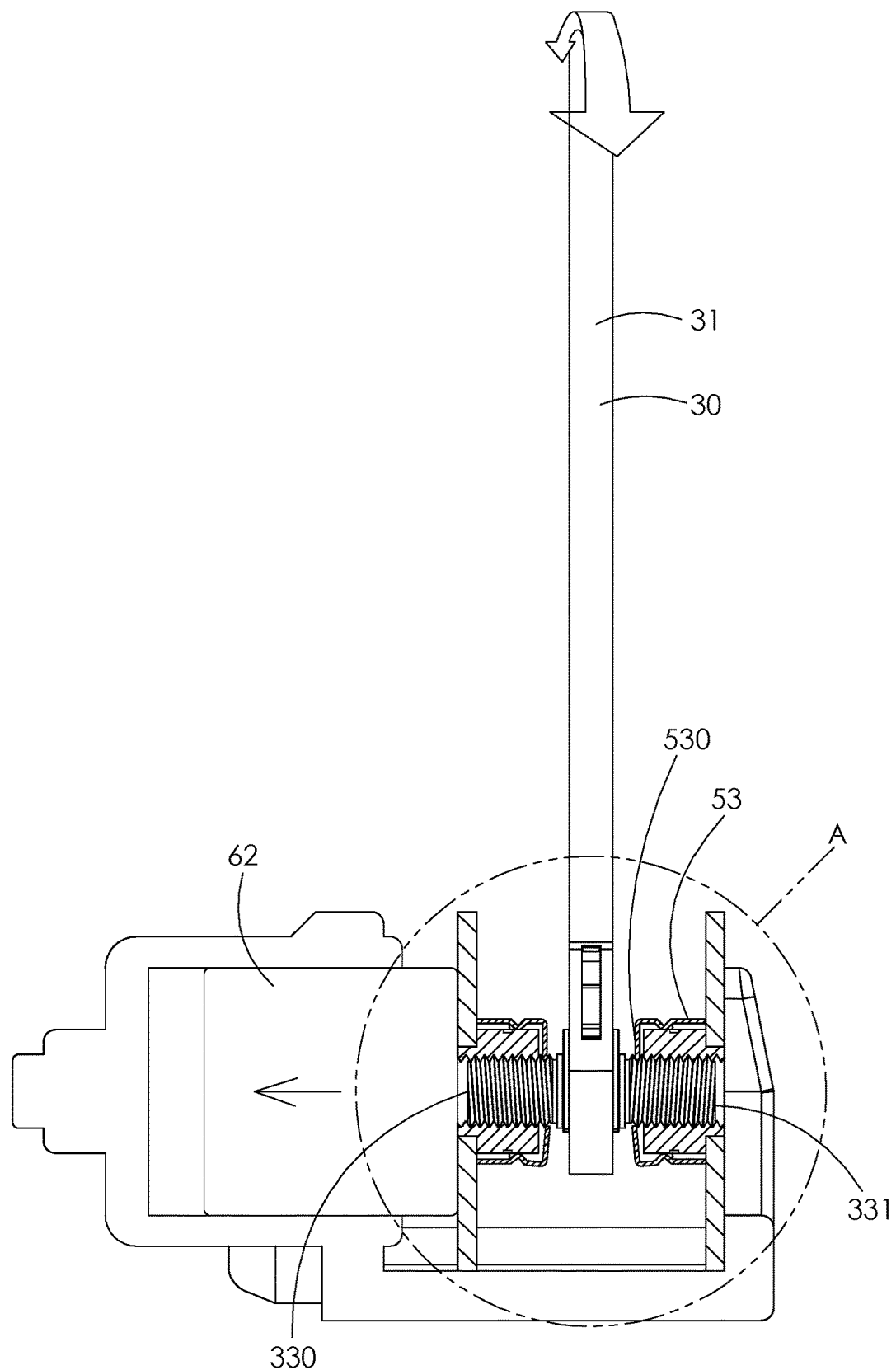
FIG. 11 is a cross-sectional view of the first pressure plate assembly and the second pressure assembly of the present invention when the operating handle is swung back and forth.
Figure 12:
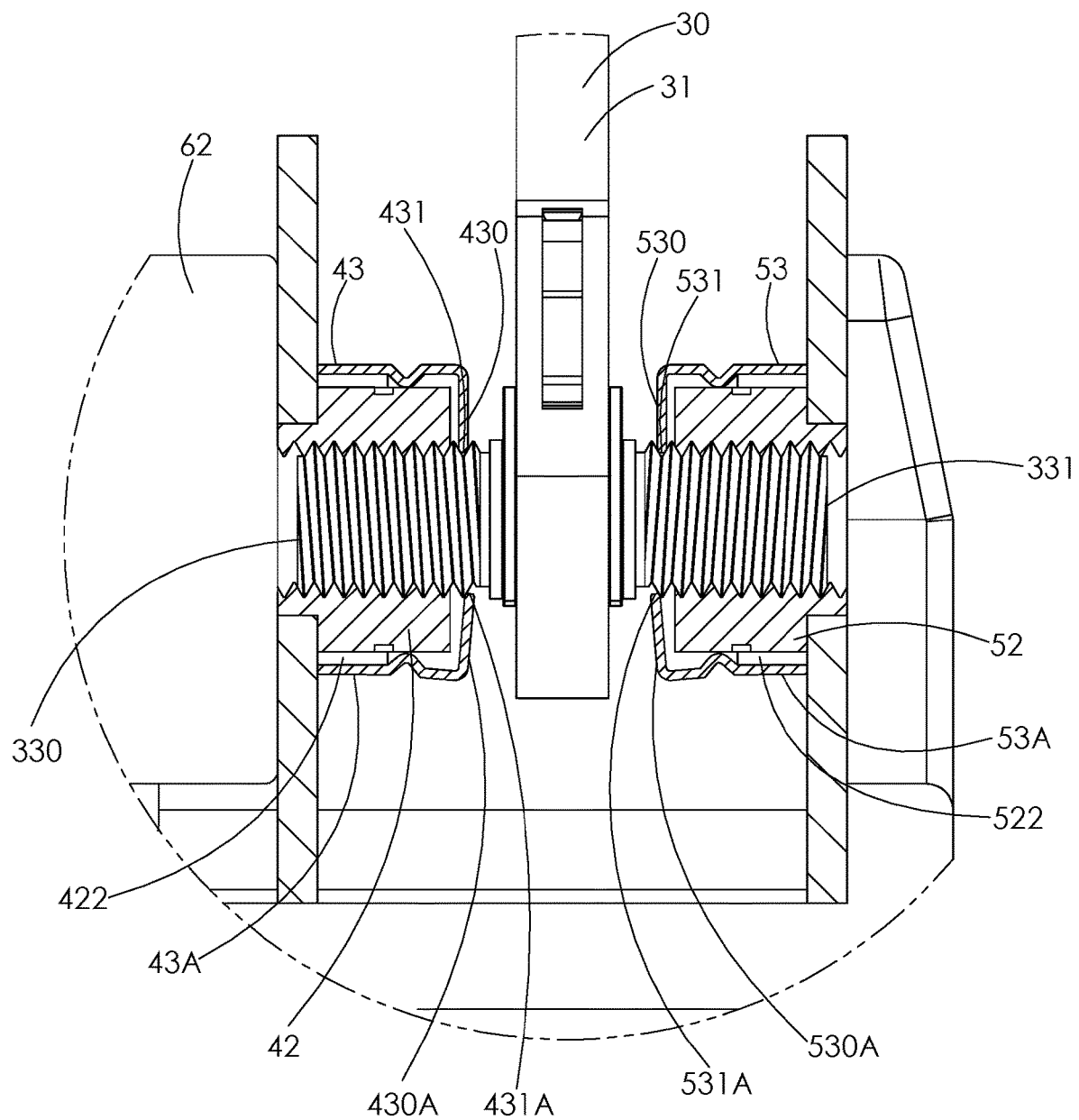
FIG. 12 is an enlarged view of circle A of FIG. 11.
Figure 13:
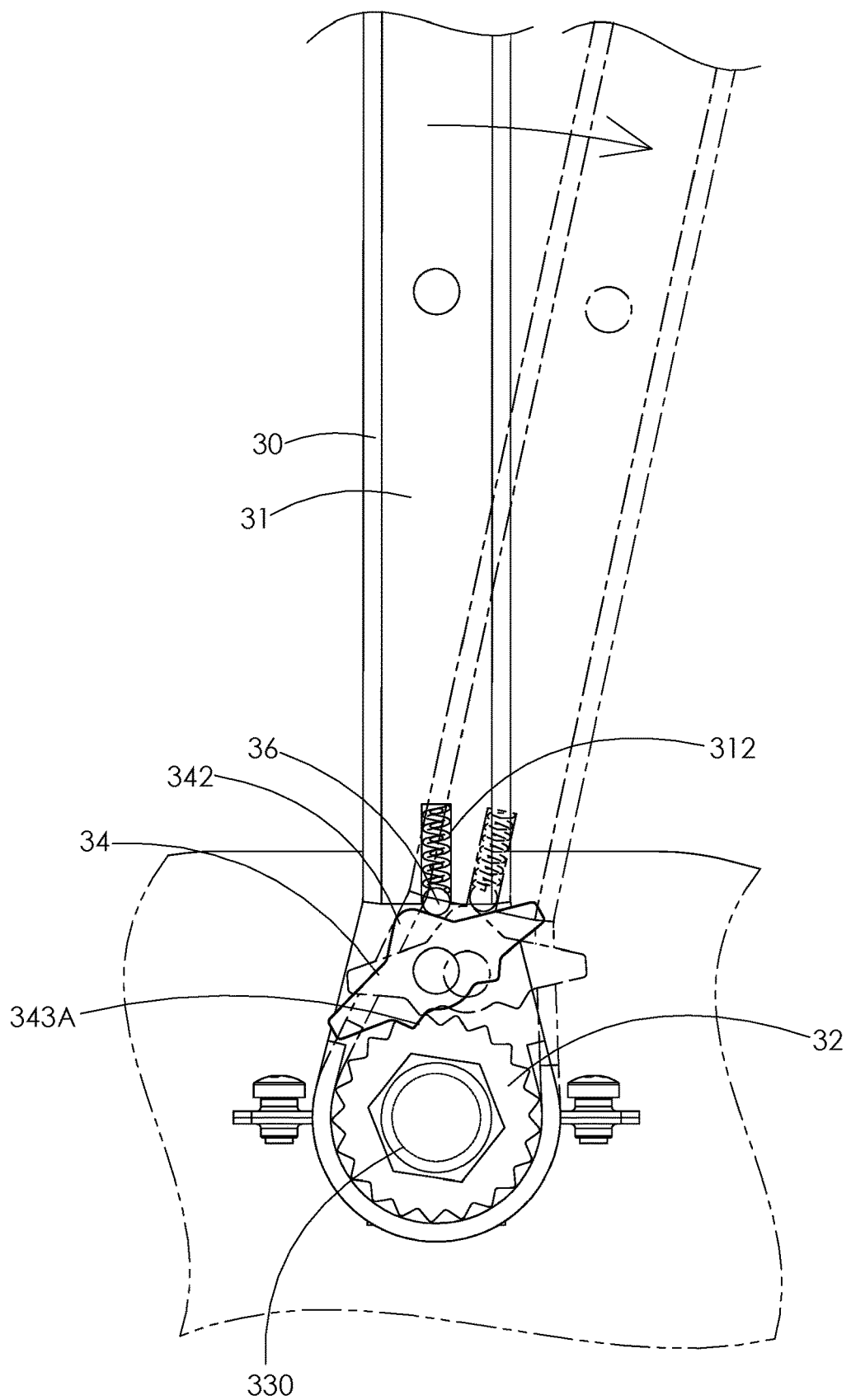
FIG. 13 is a schematic view showing the state of the reversible ratchet wrench of the present invention when the ratchet wheel is restricted from rotating reversely.

As shown in FIG. 8, FIG. 9 and FIG. 10, when in use, the first pressure plate 41 and the second pressure plate 51 of the tool 20 are placed in an internal space 61 of a caliper housing 60 and located between at least one piston 62 that is not retracted and a fixed wall 63. The force output direction of the reversible ratchet wrench 30 is selective (for example, the counterclockwise force is selected). The operating handle 31 of the reversible ratchet wrench 30 is pulled back and forth, and then the ratchet wheel 32 (rotated counterclockwise) links the first force output shaft 330 and the second force output shaft 331 to rotate in one direction (counterclockwise). The spiral movement of the first external thread 330A (right-hand external thread) and the second external thread 331A (left-hand external thread) act on the first internal screw hole 420 of the non-rotating first nut 42 and the second inner screw hole 520 of the non-rotating second nuts 52, such that the first pressure plate 41 and the second pressure plate 51 are driven to extend and move away from each other. The fixed wall 63 is configured to confine the movement of the first pressure plate 41 and the second pressure plate 51 and serves as a force support (the outer surface 510 of the second pressure plate 51 abuts against the fixed wall 63 to be supported), so that the piston 62 is retracted (by the outer surface 410 of the first pressure plate 41) to the starting position in the cylinder. As shown in FIG. 11, FIG. 12 and FIG. 13, in the process of retracting the piston 62, the first engaging notch 431 of the first L-shaped elastic plate 430 of the first buckle member 43 and the second engaging notch 531 of the second L-shaped elastic plate 530 of the second buckle member 53 are pressed against the first force output shaft 330 and the second force output shaft 331 to provide an anti-rotation effect. Thus, when the operating handle 31 of the reversible ratchet wrench 30 is pulled back, it will not link the ratchet wheel 32, so as to ensure the stability and effectiveness of the operation for retracting the piston 62. The convenience of using the tool 20 with one hand is also improved.

Figure 5A:
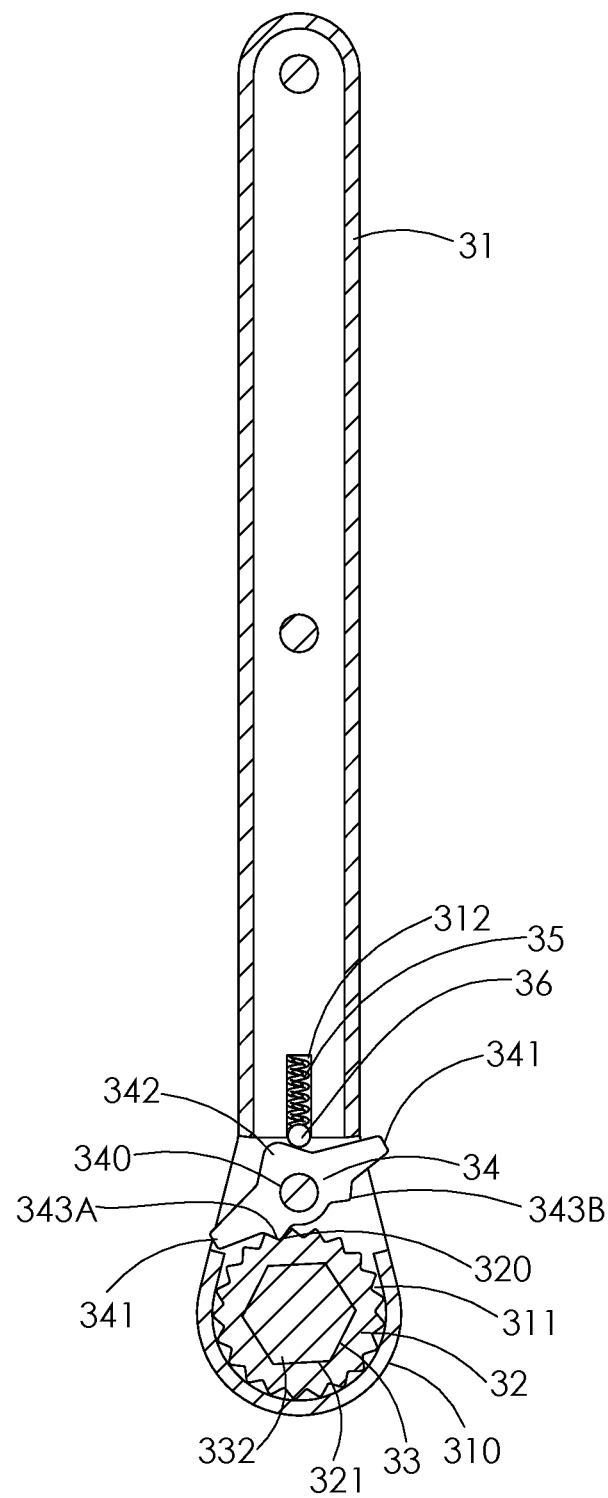
FIG. 5A is a cross-sectional view of the reversible ratchet wrench of the present invention.
Figure 10A:
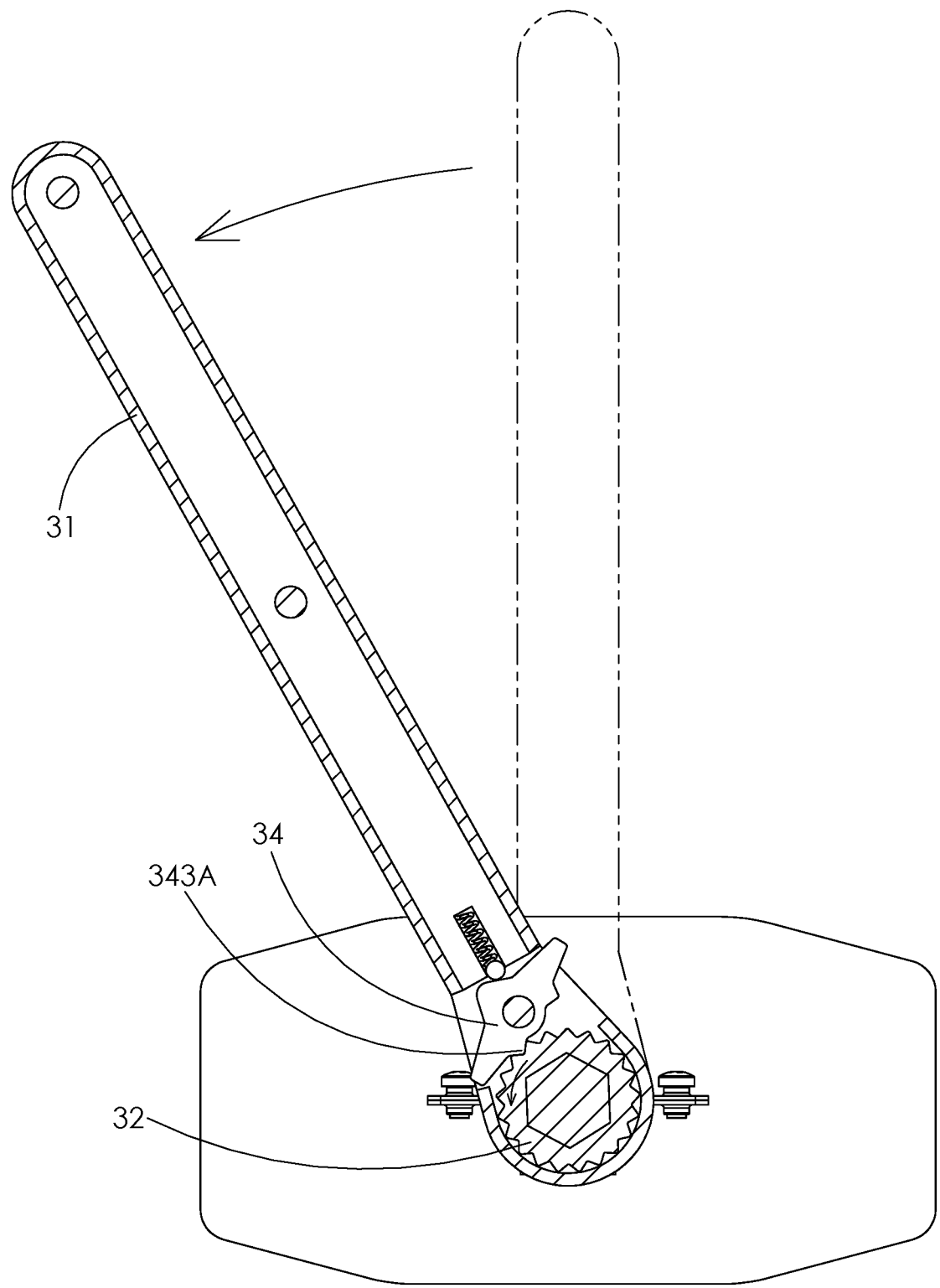
FIG. 10A is a schematic view of the present invention when in use, showing that the operating handle is swung in one direction (counterclockwise)

According to the above embodiment, as shown in FIG. 5 and FIG. 5A, the force output end 30 of the operating handle 31 has an accommodating hole 311 therein. The ratchet wheel 32 and a pawl 34 are pivotally connected in the accommodating hole 311. The pawl 34 in the accommodating hole 311 is pivotally connected to the side edge of the ratchet wheel 32 through a pivot hole 340. The pawl 34 has a pair of switching portions 341 that are disposed at both ends of the pivot hole 340 and extend out of the accommodating hole 311 for selecting the force output direction. A nose-shaped protrusion 342 is formed on one side between the pair of switching portions 341. Two spaced claws 343A, 343B each corresponding in shape to a tooth space 320 of the ratchet wheel 32 are formed on the other side between the pair of switching portions 341. One side of the pawl 34 is provided with a spring 35 installed in a long groove 312 to push a stopper 36 (preferably a steel ball) against one side of the nose-shaped protrusion 342, so that one of the two claws 343A, 343B is engaged with the tooth space 320 of the ratchet wheel 32. As shown in FIG. 10A, when the operating handle 31 is swung in one direction (counterclockwise), the claw 343A of the pawl 34 pushes the ratchet wheel 32 to rotate (counterclockwise). On the contrary, as shown in FIG. 13, when the operating handle 31 is swung back, the nose-shaped protrusion 342 presses the stopper 36 into the long groove 312, so that the claw 343A jumps on the teeth of the ratchet wheel 32 and won't push the ratchet wheel to rotate reversely, thereby achieving the effect of unidirectional rotation of the ratchet wheel 32. As shown in FIG. 12 and FIG. 13, when the operating handle 31 is swung back, the stopper 36 against the surface of the nose-shaped protrusion 342 of the pawl 34 is compressed and it has low resistance and rebounds back in height after being compressed, such that the first L-shaped elastic plate 430 of the first buckle member 43 and the second L-shaped elastic plate 530 of the second buckle member 53 are pressed against the first force output shaft 330 and the second force output shaft 331 to provide an anti-rotation effect so that the ratchet wheel 32 won't be pushed by the pawl 34 to rotate reversely when the operating handle 31 is swung back.

According to the above embodiment, as shown in FIG. 5 and FIG. 5A, a polygonal mounting hole 321 (preferably a hexagonal mounting hole) is formed in the center of the ratchet wheel 32. A polygonal coupling portion 332 is formed between the first force output shaft 330 and the second force output shaft 331 of the force output member 33 relative to the polygonal mounting hole 321. The polygonal coupling portion 332 is mounted to the polygonal mounting hole 321, so that the force output member 33 is coupled to the center of the ratchet wheel 32. The force output member 33 can be processed independently with a bar material. The arrangement of the force output member 33 in the center of the ratchet wheel 32 reduces the waste loss of processing materials.

According to the above embodiment, as shown in FIG. 4, FIG. 6 and FIG. 7, the first pressure plate 41 and the second pressure plate 51 each have a coupling hole 412, 512 relative to the first force output shaft 330 and the second force output shaft 331. The first nut 42 and the second nut 52 each have a neck portion 421, 521 relative to the coupling hole 412 of the first pressure plate 41 and the coupling hole 512 of the second pressure plate 51. The neck portion 421 of the first nut 42 is tightly fitted (oil pressure bonding or welding bonding) and fixed to the coupling hole 412 of the first pressure plate 41, and the neck portion 521 of the second nut 52 is tightly fitted (oil pressure bonding or welding bonding) and fixed to the coupling hole 512 of the second pressure plate 51. The first pressure plate 41 and the second pressure plate 51 can be concentrically, symmetrically extended away from each other or retracted toward each other.

According to the above embodiment, as shown in FIG. 4, FIG. 6 and FIG. 7, the first nut 42 has an even-numbered polygonal surface 422 (preferably a hexagonal surface). A pair of first buckle members 43, 43A made of an elastic metal sheet material and corresponding in shape to the polygonal surface 422 is butted and fixed to the polygonal surface 422 (fixed by screws). The first engaging notches 431, 431A of the first L-shaped elastic plates 430, 430A of the pair of first buckle members 43, 43A are pressed against the first external thread of the first force output shaft 330. The polygonal surface 422 of the first nut 42 limits the pair of first buckle members 43, 43A on the first nut 42 without swinging and offset, so that the first force output shaft 330 is pressed by the first L-shaped elastic plates 430, 430A of the pair of first buckle members 43, 43A. As shown in FIG. 8 and FIG. 10, the anti-rotation effect on the first force output shaft 330 can be achieved when the operating handle 31 of the reversible ratchet wrench 30 is pulled back. As shown in FIG. 6, the polygonal surface 422 of the first nut 42 is circumferentially formed with a groove 423. The pair of first buckle members 43, 43A is provided with at least one buckle 432, 432A to be engaged in the groove 423. By the buckle 432, 432A engaged in the groove 423, the pair of first buckle members 43, 43A won't displace axially on the first nut 42. As shown in FIG. 12, in the process that the first engaging notches 431, 431A of the first L-shaped elastic plates 430, 430A jump on the roots and crests of the first external thread 330A, the pair of first buckle members 43, 43A won't be axially disengaged from the polygonal surface 422 of the first nut 42. As shown in FIG. 6, the pair of first buckle members 43, 43A is butted on the polygonal surface 422 of the first nut 42. The first L-shaped elastic plates 430, 430A are disposed on distal end faces 433, 433A of the pair of first buckle members 43, 43A, relative to the butting position (the locking position of the screws). The distal end surfaces 433, 433A each have a pair of slots 434, 434A at respective two sides of the first L-shaped elastic plates 430, 430A, so that the connection of the first L-shaped elastic plates 430, 430A and the distal end faces 433, 433A has good recovery elasticity.

According to the above embodiment, as shown in FIG. 4, FIG. 6 and FIG. 7, the second nut 52 has an even-numbered polygonal surface 522 (preferably a hexagonal surface). A pair of second buckle members 53, 53A made of an elastic metal sheet material and corresponding in shape to the polygonal surface 522 is butted and fixed to the polygonal surface 522 (fixed by screws). The second engaging notches 531, 531A of the second L-shaped elastic plates 530, 530A of the pair of second buckle members 53, 53A are pressed against the second external thread of the second force output shaft 331. The polygonal surface 522 of the second nut 52 limits the pair of second buckle members 53, 53A on the second nut 52 without swinging and offset, so that the second force output shaft 331 is pressed by the second L-shaped elastic plates 530, 530A of the pair of second buckle members 53, 53A. As shown in FIG. 8 and FIG. 10, the anti-rotation effect of the second force output shaft 331 can be achieved when the operating handle 31 of the reversible ratchet wrench 30 is pulled back. As shown in FIG. 6, the polygonal surface 522 of the second nut 52 is circumferentially formed with a groove 523. The pair of second buckle members 53, 53A is provided with at least one buckle 532, 532A to be engaged in the groove 523. By the buckle 532, 532A engaged in the groove 523, the pair of second buckle members 53, 53A won't displace axially on the second nut 52. In the process that the second engaging notches 531, 531A of the second L-shaped elastic plates 530, 530A jump on the roots and crests of the second external thread 331A, the pair of second buckle members 53, 53A won't be axially disengaged from the polygonal surface 522 of the second nut 52. As shown in FIG. 6, the pair of second buckle members 53, 53A is butted on the polygonal surface 522 of the second nut 52. The second L-shaped elastic plates 530, 530A are disposed on distal end faces 533, 533A of the pair of second buckle members 53, 53A relative to the butting position (the locking position of the screws). The distal end surfaces 533, 533A each have a pair of slots 534, 534A at respective two sides of the second L-shaped elastic plates 530, 530A, so that the connection of the second L-shaped elastic plates 530, 530A and the distal end faces 533, 533A has good recovery elasticity.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A disc brake piston retraction tool, comprising a reversible ratchet wrench, a first pressure plate assembly, and a second pressure plate assembly;

the reversible ratchet wrench including an operating handle, a ratchet wheel located at a force output end of the operating handle, and a force output member located at a center of the ratchet wheel; the force output member having a first force output shaft and a second force output shaft that are located at both sides of the center of the ratchet wheel and extend out of both sides of the force output end of the operating handle respectively, a surface of the first force output shaft being formed with a first external thread, a surface of the second force output shaft being formed with a second external thread, the first external thread and the second external thread being in different spiral directions;

the first pressure plate assembly including a first pressure plate, a first nut and at least one first buckle member; the first pressure plate having an outer surface and an inner surface; the first nut being fixed to the inner surface of the first pressure plate relative to the first force output shaft, the first nut having a first internal screw hole screwed with the first external thread; the first buckle member being fixed on an outer surface of the first nut, a front edge of one end of the first buckle member having a first L-shaped elastic plate extending in the direction of the surface of the first force output shaft, the first L-shaped elastic sheet being formed with a first engaging notch corresponding in diameter to the first force output shaft and pressed against the first external thread to jump on roots and crests of the first external thread;

the second pressure plate assembly including a second pressure plate, a second nut and at least one second buckle member; the second pressure plate having an outer surface and an inner surface; the second nut being fixed to the inner surface of the second pressure plate relative to the second force output shaft, the second nut having a second internal screw hole screwed with the second external thread; the second buckle member being fixed on an outer surface of the second nut, a front edge of one end of the second buckle member having a second L-shaped elastic plate extending in the direction of the surface of the second force output shaft, the second L-shaped elastic sheet being formed with a second engaging notch corresponding in diameter to the second force output shaft and pressed against the second external thread to jump on roots and crests of the second external thread.

2. The disc brake piston retraction tool as claimed in claim 1, wherein the force output end of the operating handle has an accommodating hole therein, the ratchet wheel and a pawl are pivotally connected in the accommodating hole, the pawl in the accommodating hole is pivotally connected to a side edge of the ratchet wheel through a pivot hole, the pawl has a pair of switching portions that are disposed at both ends of the pivot hole and extend out of the accommodating hole, a nose-shaped protrusion is formed on one side between the pair of switching portions, two spaced claws each corresponding in shape to a tooth space of the ratchet wheel are formed on another side between the pair of switching portions, one side of the pawl is provided with a spring installed in a long groove to push a stopper against one side of the nose-shaped protrusion, so that one of the two claws is engaged with the tooth space of the ratchet wheel.

3. The disc brake piston retraction tool as claimed in claim 1, wherein a polygonal mounting hole is formed in the center of the ratchet wheel, a polygonal coupling portion is formed between the first force output shaft and the second force output shaft of the force output member relative to the polygonal mounting hole, and the polygonal coupling portion is mounted to the polygonal mounting hole so that the force output member is coupled to the center of the ratchet wheel.

4. The disc brake piston retraction tool as claimed in claim 1, wherein the first pressure plate and the second pressure plate each have a coupling hole relative to the first force output shaft and the second force output shaft, the first nut and the second nut each have a neck portion relative to the coupling hole of the first pressure plate and the coupling hole of the second pressure plate, the neck portion of the first nut is tightly fitted and fixed to the coupling hole of the first pressure plate, and the neck portion of the second nut is tightly fitted and fixed to the coupling hole of the second pressure plate.

5. The disc brake piston retraction tool as claimed in claim 1, wherein the first nut has an even-numbered polygonal surface, a pair of the first buckle members corresponding in shape to the polygonal surface is butted and fixed to the polygonal surface, and the first engaging notches of the first L-shaped elastic plates of the pair of first buckle members are pressed against the first external thread of the first force output shaft.

6. The disc brake piston retraction tool as claimed in claim 5, wherein the polygonal surface of the first nut is circumferentially formed with a groove, and the pair of first buckle members is provided with at least one buckle to be engaged in the groove.

7. The disc brake piston retraction tool as claimed in claim 5, wherein the pair of first buckle members is butted on the polygonal surface of the first nut, the first L-shaped elastic plates are disposed on distal end faces of the pair of first buckle members relative to a butting position, and the distal end surfaces each have a pair of slots at respective two sides of the first L-shaped elastic plates.

8. The disc brake piston retraction tool as claimed in claim 1, wherein the second nut has an even-numbered polygonal surface, a pair of the second buckle members corresponding in shape to the polygonal surface is butted and fixed to the polygonal surface, and the second engaging notches of the second L-shaped elastic plates of the pair of second buckle members are pressed against the second external thread of the second force output shaft.

9. The disc brake piston retraction tool as claimed in claim 8, wherein the polygonal surface of the second nut is circumferentially formed with a groove, and the pair of second buckle members is provided with at least one buckle to be engaged in the groove.

10. The disc brake piston retraction tool as claimed in claim 8, wherein the pair of second buckle members is butted on the polygonal surface of the second nut, the second L-shaped elastic plates are disposed on distal end faces of the pair of second buckle members relative to a butting position, and the distal end surfaces each have a pair of slots at respective two sides of the second L-shaped elastic plates.

\* \* \* \* \*